United States Patent
Yamashita

(10) Patent No.: US 11,118,648 B2
(45) Date of Patent: Sep. 14, 2021

(54) DAMPING FORCE ADJUSTABLE SHOCK ABSORBER

(71) Applicant: HITACHI AUTOMOTIVE SYSTEMS, LTD., Ibaraki (JP)

(72) Inventor: Mikio Yamashita, Zama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 47 days.

(21) Appl. No.: 16/491,677

(22) PCT Filed: Mar. 13, 2018

(86) PCT No.: PCT/JP2018/009775
§ 371 (c)(1),
(2) Date: Sep. 6, 2019

(87) PCT Pub. No.: WO2018/168865
PCT Pub. Date: Sep. 20, 2018

(65) Prior Publication Data
US 2020/0032871 A1    Jan. 30, 2020

(30) Foreign Application Priority Data

Mar. 13, 2017 (JP) .............................. JP2017-047921
Mar. 15, 2017 (JP) .............................. JP2017-050586

(51) Int. Cl.
*F16F 9/34* (2006.01)
*F16F 9/348* (2006.01)
(Continued)

(52) U.S. Cl.
CPC ................ *F16F 9/348* (2013.01); *F16F 9/18* (2013.01); *F16F 9/465* (2013.01); *F16F 9/50* (2013.01);
(Continued)

(58) Field of Classification Search
CPC .... F16F 9/18; F16F 9/348; F16F 9/464; F16F 9/465; F16F 9/50
(Continued)

(56) References Cited

U.S. PATENT DOCUMENTS

| 6,119,831 A | 9/2000 | Knecht et al. |
| 6,371,262 B1 * | 4/2002 | Katou .................... F16F 9/465 188/266.5 |

(Continued)

FOREIGN PATENT DOCUMENTS

| JP | 11-72133 | 3/1999 |
| JP | 2011-179546 | 9/2011 |

(Continued)

OTHER PUBLICATIONS

International Search Report dated Jun. 12, 2018 in International (PCT) Application No. PCT/JP2018/009775 with English translation.

(Continued)

*Primary Examiner* — Christopher P Schwartz
(74) *Attorney, Agent, or Firm* — Wenderoth, Lind & Ponack, L.L.P.

(57) ABSTRACT

[Problem] The present invention provides a damping force adjustable shock absorber capable of reducing manufacturing cost.
[Means for Solving] A shock absorber 1 is configured in such a manner that a main valve 32 is disposed below a piston valve 5, and a sub valve 68 for variably adjusting a set load of the main valve 32 is provided in a piston case 21 above the piston valve 5, with a first valve body 53 of the sub valve 68 slidably sealed to a case member 60 by a metal seal at only one portion. Due to the configuration, the shock absorber 1 can ease precision of components of the sub valve 68, thereby reducing the manufacturing cost.

1 Claim, 7 Drawing Sheets

(51) Int. Cl.
*F16F 9/18* (2006.01)
*F16F 9/46* (2006.01)
*F16F 9/50* (2006.01)
*B60G 13/08* (2006.01)
*B60G 17/08* (2006.01)

(52) U.S. Cl.
CPC .............. *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2500/114* (2013.01); *B60G 2800/162* (2013.01); *F16F 9/185* (2013.01); *F16F 2222/12* (2013.01); *F16F 2228/066* (2013.01)

(58) Field of Classification Search
USPC .............................................. 188/266, 266.5
See application file for complete search history.

(56) References Cited

U.S. PATENT DOCUMENTS

| | | | | |
|---|---|---|---|---|
| 7,946,399 | B2 * | 5/2011 | Masamura | F16F 9/465 188/282.4 |
| 2006/0225976 | A1 * | 10/2006 | Nakadate | F16F 9/464 188/266 |
| 2011/0168935 | A1 * | 7/2011 | Heyn | F16F 9/48 251/321 |
| 2011/0209956 | A1 | 9/2011 | Maeda | |
| 2011/0214953 | A1 | 9/2011 | Maeda et al. | |
| 2016/0236533 | A1 * | 8/2016 | Inagaki | B60G 17/08 |
| 2017/0328440 | A1 * | 11/2017 | Sakuta | F16F 9/34 |
| 2019/0128360 | A1 * | 5/2019 | Sakuta | F16F 9/348 |
| 2019/0136937 | A1 * | 5/2019 | Kess | F16F 9/464 |

FOREIGN PATENT DOCUMENTS

| | | |
|---|---|---|
| JP | 2011-202800 | 10/2011 |
| JP | 2015-72047 | 4/2015 |
| JP | 2016-98949 | 5/2016 |

OTHER PUBLICATIONS

Written Opinion of the International Searching Authority dated Jun. 12, 2018 in International (PCT) Application No. PCT/JP2018/009775 with English translation.

* cited by examiner

DAMPING FORCE ADJUSTABLE SHOCK ABSORBER

TECHNICAL FIELD

The present invention relates to a damping force adjustable shock absorber including a damping valve mechanism built in a cylinder.

BACKGROUND ART

Conventionally, there has been known a damping force adjustable shock absorber including a damping valve mechanism built in a cylinder.

For example, PTL 1 discloses a damping force adjustable shock absorber including a needle-type check valve and a mechanism for variably adjusting a set load thereof, which are mounted above a piston.

Further, some of shock absorbers exert a damping force variable in reaction to a frequency (for example, refer to PTL 2).

CITATION LIST

Patent Literature

[PTL 1] Japanese Patent Application Public Disclosure No. 11-72133
[PTL 2] Japanese Patent Application Public Disclosure No. 2011-202800

SUMMARY OF INVENTION

Technical Problem

However, when the mechanism that exerts the damping force variable in reaction to the frequency discussed in PTL 2 is combined with the damping force adjustable shock absorber discussed in PTL 1, this combination may lead to an increase in an axial length.

Therefore, the present invention has been made in consideration of the above-described circumstances, and has been contrived with the object of providing a damping force adjustable shock absorber capable of shortening the axial length thereof.

Solution to Problem

To achieve the above-described object, a damping force adjustable shock absorber according to one aspect of the present invention includes a cylinder sealingly containing hydraulic fluid therein, a piston slidably and fittedly mounted inside this cylinder and partitioning an inside of the cylinder into two chambers, a one-side chamber and an opposite-side chamber, a piston rod having one end coupled with the piston and an opposite end protruding out of the cylinder, a first passage and a second passage establishing communication between the two chambers in the cylinder, a first main valve configured to generate a damping force against a flow of the fluid in the first passage that is generated when the piston in the cylinder moves to one side, and a control valve configured to be driven by a solenoid and control the damping force that is generated when the piston in the cylinder moves to the one side and an opposite side. The first main valve includes a damping valve provided in a tubular first case member provided on an outer peripheral side of the piston and configured to generate the damping force by restricting the flow of the hydraulic fluid flowing via the first passage when the piston moves to the one side, a back-pressure chamber configured to apply an inner pressure to this damping valve in a valve-closing direction, and a back-pressure chamber introduction passage configured to introduce the hydraulic fluid from a chamber on an upstream side toward a back-pressure chamber side where the back-pressure chamber is located. The damping valve includes a deflectable annular disk provided with a seal unit configured to seal between the damping valve and the first case member. The disk is disposed in the first case member or a second case member provided on the outer peripheral side of the piston rod with the piston rod extending therethrough. The disk is supported on an inner peripheral side or an outer peripheral side thereof. The damping valve further includes two chambers in the case member that are provided by being defined by the disk. The disk blocks at least a unidirectional flow through the second passage.

Further, a damping force adjustable shock absorber according to another aspect of the present invention includes a cylinder sealingly containing hydraulic fluid therein, a piston slidably and fittedly mounted inside this cylinder and partitioning an inside of the cylinder into two chambers, a one-side chamber and an opposite-side chamber, a piston rod having one end coupled with the piston and an opposite end protruding out of the cylinder, a first passage and a second passage establishing communication between the two chambers in the cylinder, a first main valve configured to generate a damping force against a flow of the fluid in the first passage that is generated when the piston in the cylinder moves to one side, a second main valve configured to generate a damping force against a flow of the fluid in the second passage that is generated when the piston in the cylinder moves to an opposite side, and a control valve configured to be driven by a solenoid and control the damping force that is generated when the piston in the cylinder moves to the one side and the opposite side. The first main valve includes a damping valve configured to generate the damping force by restricting the flow of the hydraulic fluid flowing via the first passage when the piston moves to the one side, a back-pressure chamber configured to apply an inner pressure to this damping valve in a valve-closing direction, and a back-pressure chamber introduction passage configured to introduce the hydraulic fluid from a chamber on an upstream side toward a back-pressure chamber side where the back-pressure chamber is located. The control valve includes a tubular case member slidably containing a plunger configured to be driven by the solenoid therein and opened on one end side thereof, and a valve seat member including an annular valve seat provided on a side facing the opening. This valve seat has an inner peripheral side in communication with the one-side chamber and the back-pressure chamber introduction passage and an outer peripheral side in communication with the opposite-side chamber. The control valve further includes an orifice passage provided between the outer peripheral side of the valve seat and the opposite-side chamber, a unidirectional valve permitting a flow of the hydraulic fluid from the outer peripheral side of the valve seat to the opposite-side chamber, a first valve body slidably provided in the case member and configured to control the flow of the hydraulic fluid by being separated from or contacting the valve seat, and a second valve body configured to be seated on an inner valve seat provided between an orifice passage at a bottom portion of this first valve body inside the case member and the one-side chamber. The second valve body is configured to move according to the movement of the plunger. The damping adjustable shock absorber further includes a tubular case member in which at least a part of the back-pressure chamber introduction passage is formed. The case member is provided on an outer peripheral side of the piston rod. The damping force adjustable shock absorber further includes a deflectable annular disk disposed with the piston rod extending therethrough in the case member. The disk is supported on an inner peripheral side or an outer peripheral side thereof. The disk is provided with an annular elastic seal member sealing between the disk and the case member or between the disk and the piston rod. The damping force adjustable shock absorber further includes two chambers in the case member that are provided by being defined by the disk. The disk blocks at least a unidirectional flow through the second passage.

Advantageous Effects of Invention

According to the present invention, the axial length of the damping force adjustable shock absorber can be shortened.

DESCRIPTION OF EMBODIMENTS

Each of embodiments of the present invention will be described with reference to the accompanying drawings. For the sake of convenience, a vertical direction herein is defined to refer to a vertical direction in FIGS. 1 and 2.

First Embodiment

Figure 1:
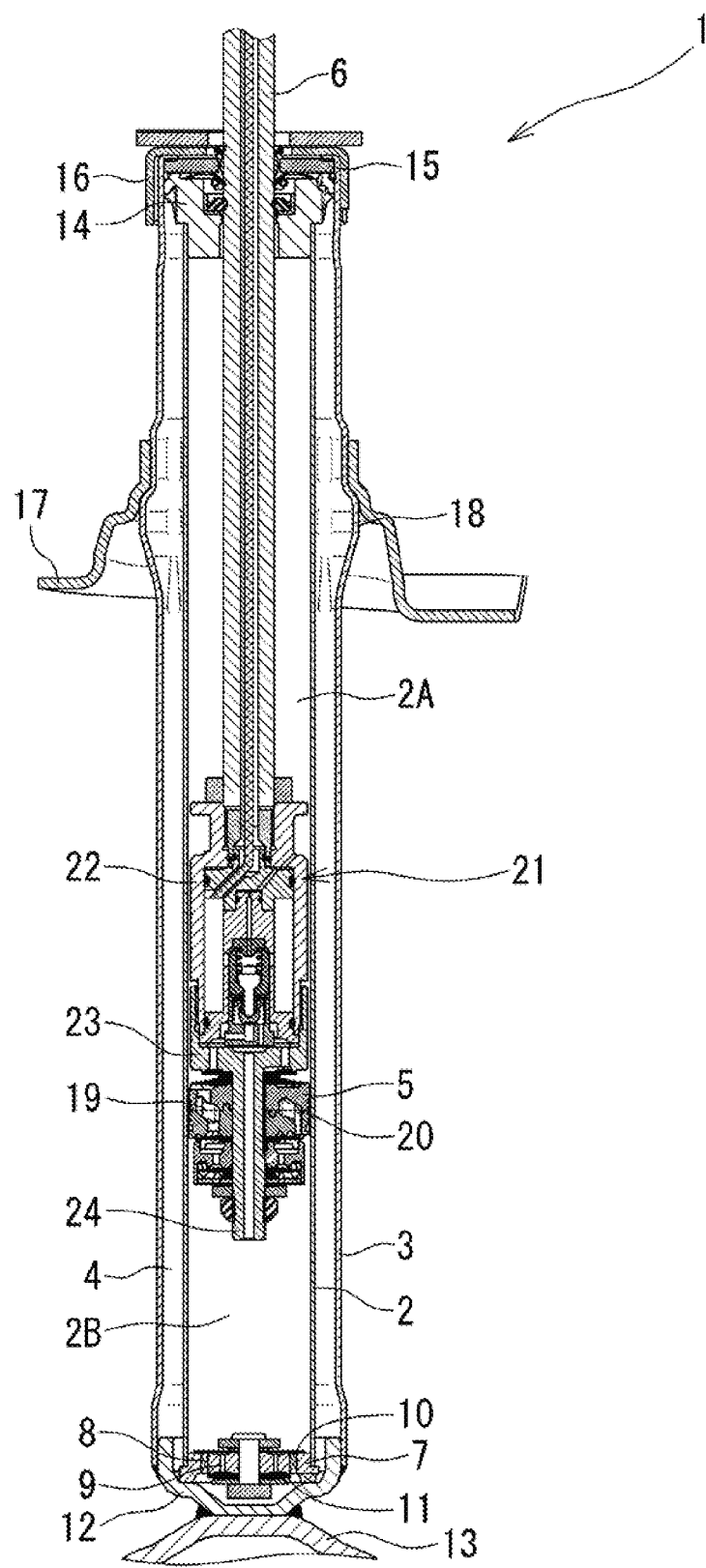
FIG. 1 is a cross-sectional view of a damping force adjustable shock absorber to which a first embodiment is applied that is taken along an axial plane thereof.

As illustrated in FIG. 1, a damping force adjustable shock absorber 1 (hereinafter referred to as a "shock absorber 1") employs a twin-tube structure including an outer tube 3 provided outside a cylinder 2, and a reservoir 4 is formed between the cylinder 2 and the outer tube 3. A piston valve 5 is slidably and fittedly mounted in the cylinder 2, and this piston valve 5 partitions the inside of the cylinder 2 into two chambers, a cylinder upper chamber 2A as a one-side chamber and a cylinder lower chamber 2B as an opposite-side chamber. The piston valve 5 includes an extension-side passage 19 and a compression-side passage 20. The extension-side passage 19 serves as a first passage having an upper end opened to the cylinder upper chamber 2A. The compression-side passage 20 serves as a second passage having a lower end opened to the cylinder lower chamber 2B. Further, the piston valve 5 according to the first embodiment is a component structured so as to be divided in half vertically.

A base valve 7 is provided at a lower end portion of the cylinder 2. The base valve 7 separates the cylinder lower chamber 2B and the reservoir 4 from each other. Passages 8 and 9 are provided at the base valve 7. The passages 8 and 9 establish communication between the cylinder lower chamber 2B and the reservoir 4. A check valve 10 is provided in the passage 8. The check valve 10 permits only a flow of oil fluid (hydraulic fluid) from the reservoir 4 side to the cylinder lower chamber 2B side. On the other hand, a disk valve 11 is provided in the passage 9. When a pressure of the oil fluid on the cylinder lower chamber 2B side reaches a set pressure, the disk valve 11 is opened to release this pressure to the reservoir 4 side. As the hydraulic fluid, oil fluid is sealingly contained in the cylinder 2, and oil fluid and gas are sealingly contained in the reservoir 4. Now, a reference numeral 12 and a reference numeral 13 in FIG. 1 indicate a bottom cap joined to a lower end of the outer tube 3 and a mounting member joined to the bottom cap 12, respectively.

The piston valve 5 is coupled with a piston rod 6 via a piston case 21. The piston case 21 includes a generally cylindrical case main body 22, a case bottom portion 23, and a shaft portion 24. A lower end (one end) of the piston rod 6 is coupled with the case main body 22. The case bottom portion 23 closes a lower end of this case main body 22. The shaft portion 24 extends from this case bottom portion 23 downward with the piston valve 5 fixed thereto. An upper end (an opposite end) side of the piston rod 6 passes through the cylinder upper chamber 2A, and is further inserted through a rod guide 14 and an oil seal 15 attached to upper end portions of the cylinder 2 and the outer tube 3 to then extend out of the cylinder 2. Now, a reference numeral 16, a reference numeral 17, and a reference numeral 18 in FIG. 1 indicate a cap covering the upper end portion of the outer tube 3, a spring bearing member attached on an outer periphery of the outer tube 3, and a bulging portion of the outer tube 3 that prohibits a downward movement of the spring bearing member 17 relative to the outer tube 3, respectively.

Figure 2:
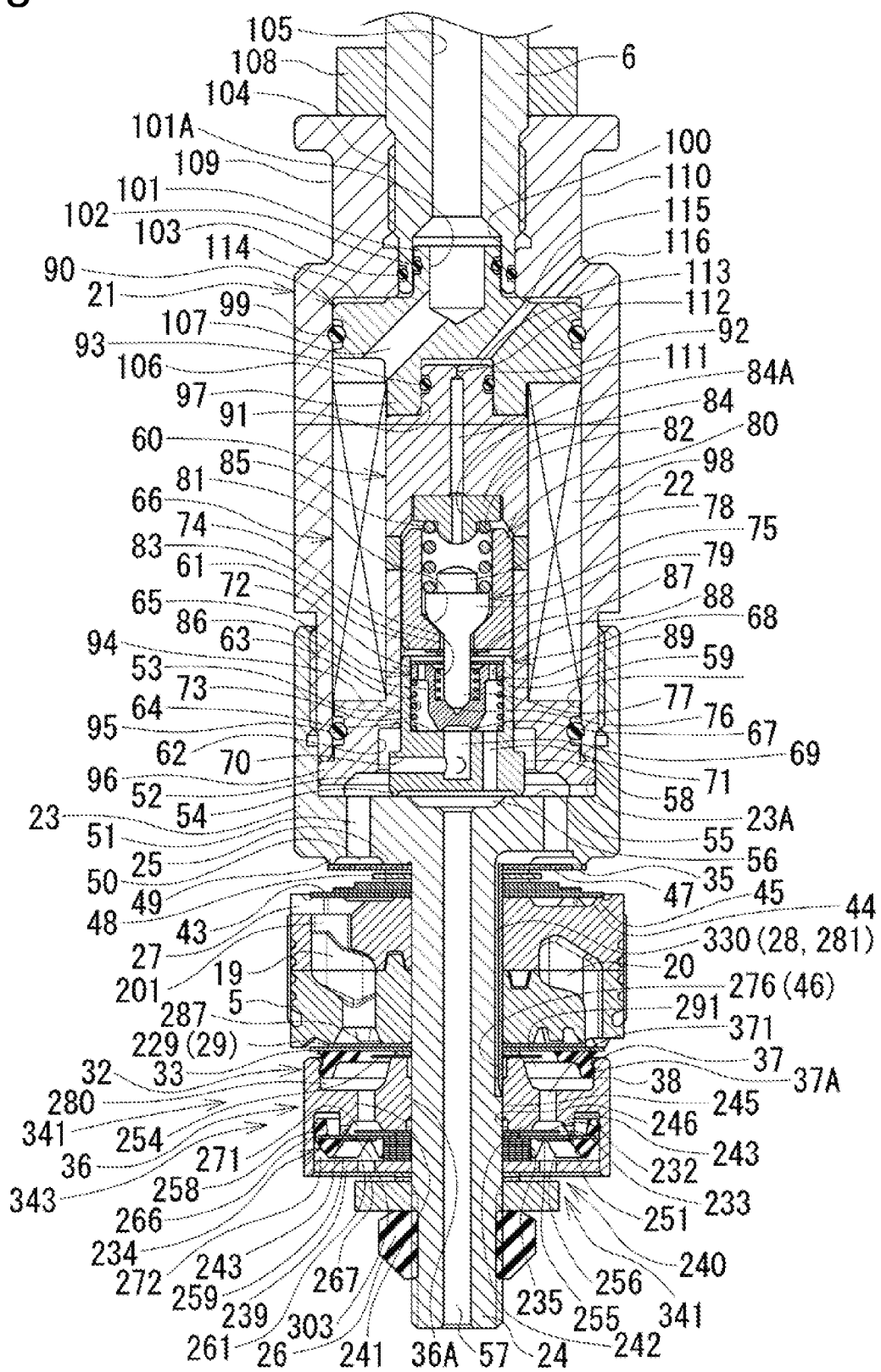
FIG. 2 illustrates main portions in FIG. 1 in an enlarged manner.

As illustrated in FIG. 2, the shock absorber 1 (refer to FIG. 1) includes a damping force generation mechanism 341 that generates a damping force by controlling a flow of the oil fluid between the cylinder upper chamber 2A (refer to FIG. 1) and the cylinder lower chamber 2B (refer to FIG. 1) that is generated according to a movement (extension/compression) of the piston rod 6. The damping force generation mechanism 341 includes a main valve 32 provided at a lower end of the piston valve 5. The main valve 32 includes a damping valve 33, a back-pressure chamber 280, and a back-pressure chamber introduction passage 35. The damping valve 33 serves as a first main valve that generates the damping force by restricting a flow of the oil fluid from the cylinder upper chamber 2A to the cylinder lower chamber 2B when the piston valve 5 moves to an extension side (one side). The back-pressure chamber 280 applies an inner pressure thereof to this damping valve 33 in a valve-closing direction. The back-pressure chamber introduction passage 35 introduces the oil fluid from the cylinder upper chamber 2A to the back-pressure chamber 280.

The damping valve 33 is embodied by a disk valve formed by stacking thin plates, with the shaft portion 24 inserted through a central shaft hole thereof and an inner peripheral edge portion thereof sandwiched between an inner peripheral portion of the piston valve 5 and a shaft portion 36A of a pilot case 36. Further, an annular packing 37 is provided on a lower surface of the damping valve 33, and a seat portion 37A of this packing 37 is in slidable abutment with an annular recessed portion 38 formed on an upper surface corresponding to one side of the pilot case 36. Due to this configuration, the annular back-pressure chamber 280 is formed between the damping valve 33 and the pilot case 36 serving as a first case member. Further, the damping valve 33 is seated on a lower end surface of the piston valve 5 so as to cover an opening of a lower end of the extension-side passage 19 formed at the piston valve 5. A first passage establishing communication between the cylinder upper chamber 2A and the cylinder lower chamber 2B is formed by a radially extending cutout-shaped passage 27 formed at the upper end of the piston valve 5, the extension-side passage 19, and a flow passage formed due to opening of the damping valve 33.

One disk 232, one disk 233 and one partition disk 234 (an annular disk), a plurality of disks 235, and a cover member 239 are provided on a lower end side corresponding to an opposite side of the pilot case 36. The pilot case 36, the disks 232, 233, and 235, and the cover member 239 are metallic. All the disks 232, 233, and 235 have holed circular plate-like shapes keeping constant thicknesses to which the shaft portion 24 can be fitted inside them, and both the pilot case 36 and the cover member 239 have annular shapes to which the shaft portion 24 can be fitted inside them.

The cover member 239 forms a tubular case member 240 together with the pilot case 36 by being fitted to the pilot case 36. The pilot case 36 includes a holed disk-shaped base portion 241, a cylindrical inner cylindrical portion 242, and a cylindrical seat portion 243. The base portion 241 extends along a direction perpendicular to an axis. The inner cylindrical portion 242 is formed on an inner peripheral side of the base portion 241 and extends along the axial direction. The seat portion 243 is formed on an outer peripheral side of the base portion 241 with respect to the inner cylindrical portion 242 and extends along the axial direction. The inner cylindrical portion 242 protrudes from the base portion 241 toward both axial sides, and the seat portion 243 protrudes from the base portion 241 only toward one axial side. Inside the inner cylindrical portion 242, a small-diameter hole portion 245 is formed on an opposite side from a direction in which the seat portion 243 protrudes in the axial direction, and a large-diameter hole portion 246 is formed on the seat portion 243 side in the axial direction. The shaft portion 24 is fitted to the small-diameter hole portion 245. The large-diameter hole portion 246 is larger in diameter than the small-diameter hole portion 245. Further, a cylindrical tubular portion 266 is formed on an outer peripheral side of the base portion 241 with respect to the seat portion 243. An axially opposite side of the cylindrical tubular portion 266 from the seat portion 243 forms the annular recessed portion 38 provided on the upper surface corresponding to the one side of the pilot case 36.

The inner cylindrical portion 242 of the pilot case 36 supports an inner peripheral side of the main valve 32 by a one-end portion thereof on the small-diameter hole portion 245 side in the axial direction, and supports an inner peripheral side of the disk 232 by an opposite-end portion thereof on the large-diameter hole portion 146 side in the axial direction. The seat portion 243 of the pilot case 36 supports an outer peripheral side of the partition disk 234 by an end portion thereof on a protruding distal side. Further, the seat portion 243 includes a circumferentially partially formed cutout 303, and a radially inner side and a radially outer side of the seat portion 243 in the case member 240 are in constant communication with each other.

The disk 232 has an outer diameter larger than a portion of the inner cylindrical portion 242 that is in contact with the disk 232, and smaller than an inner diameter of the seat portion 243. The disk 232 includes a cutout 251 formed on an inner peripheral side thereof. The cutout 251 extends radially across the portion of the inner cylindrical portion 242 that is in contact with the disk 232. The disk 233 has an outer diameter smaller than the outer diameter of the disk 232.

The partition disk 234 includes a metallic disk 255 and a rubber seal member 256 (a seal unit) fixedly attached to an outer peripheral side of the disk 255, and is configured to be elastically deformable. The disk 255 has a holed circular plate-like shape keeping a constant thickness that can be disposed so as to be spaced apart from the disk 233 inside it, and is thinner in thickness than the disk 233. The disk 255 has an outer diameter larger than an outer diameter of the seat portion 243 of the pilot case 36.

The seal member 256 has an annular shape, and is fixedly attached on the outer peripheral side of the disk 255. The seal member 256 includes an annular seal main body portion 258 (the seal unit) and an annular protrusion portion 259. The seal main body portion 258 protrudes from the disk 255 toward an opposite side from the cover member 239 in the axial direction. The protrusion portion 259 protrudes from the disk 255 toward the cover member 239 side in the axial direction. Further, an annular space is generated between the disk 255 and the pilot case 36, and the seal member 256 fixedly attaches the seal main body portion 258 and the protrusion portion 259 on both surfaces of the disk 255 via this space. The employment of such a configuration allows the seal member 256 to be easily fixedly attached to the disk 255. An inner diameter of the seal main body portion 258 at an end portion thereof on the disk 255 side, i.e., a minimum inner diameter is slightly larger than the outer diameter of the seat portion 243. This configuration allows the disk 255 of the partition disk 234 to be seated on the seat portion 243 of the pilot case 36. A radial groove 261 is formed on the protrusion portion 259. The radial groove 261 is opened on an opposite side from the disk 255, and extends or penetrates radially. Due to this radial groove 261, the disk 255 of the partition disk 234 is seated on the seat portion 243 when the pressure in the cylinder lower chamber 2B exceeds a variable chamber 271, which will be described below. Since the cutout 303 is provided at the seat portion 243, pressure-receiving areas approximately match each other on one side of the disk 255 where the seal main body portion 258 is provided and the other side of the disk 255 where the protrusion portion 259 is provided.

The disk 235 has an outer diameter larger than an inner diameter of the disk 255 of the partition disk 234. Due to this configuration, an inner peripheral side of the partition disk 234 is supported between the disk 232 and the disk 235 movably within a range corresponding to an axial length of the disk 233. Further, the annular seal member 256 is provided on the partition disk 234 on the outer peripheral side thereof, which is an unsupported side. The seal member 256 seals between the partition disk 234 and the case member 240. The seal member 256 is centered relative to the case member 240 by contacting the case member 240. In other words, the inner peripheral side of the partition disk 234 is supported by such a simple support structure that the partition disk 234 is supported by the disk 235 on only one surface side without being clamped from both surface sides.

The cover member 239 has a holed disk-like shape to which the attachment shaft portion 24 of the piston rod 6 can be fitted inside it, and is fitted in the cylindrical portion 266 of the pilot case 36. A through-hole 267 is formed through the cover member 239. The through-hole 267 axially extends through a radially intermediate portion of the cover member 239. The through-hole 267 is formed on a radially outer side of the cover member 239 with respect to the disk 235, and is formed on a radially inner side with respect to the seal member 256 brought into contact with the cover member 239 due to deflection of the disk 255.

The seal main body portion 258 of the partition disk 234 seals the space between the partition disk 234 and the cylindrical portion 266 by contacting an inner peripheral surface of the cylindrical portion 266 of the pilot case 36 along an entire circumference. In other words, the partition disk 234 is a packing valve. The seal main body portion 258 constantly seals the space between the partition disk 234 and the cylindrical portion 266 even when the partition disk 234 is deformed in an allowable range in the case member 240. The partition disk 234 is centered relative to the case member 240 as described above due to the contact of the seal main body portion 258 thereof with the cylindrical portion 266 along the entire circumference. The partition disk 234 partitions the inside of the case member 240 into the variable chamber 271 and a variable chamber 272. The variable chamber 271 is located on the base portion 241 side in the pilot case 36, and has a variable volume. The variable chamber 272 is located on the cover member 239 side in the pilot case 36, and has a variable volume. In other words, the inside of the pilot case 36 (the first case member) is partitioned into the two chambers 271 and 272 by the partition disk 234 (the annular disk). The variable chamber 271 is in communication with a passage in the large-diameter hole portion 246 of the pilot case 36 via a passage in the cutout 251 of the disk 232, and the variable chamber 272 is in communication with the cylinder lower chamber 2B (refer to FIG. 1) via a passage in the through-hole 267 of the cover member 239.

Further, the partition disk 234 (the annular disk) is stacked on the seat portion 243 of a case member main body 231 with the disk 233 inserted inside it. Further, the plurality of disks 235 and the cover member 239 are stacked on the disk 233 in this order with the shaft portion 24 inserted inside each of them. The cover member 239 is fitted to the tubular portion 266 of the pilot case 36.

The present configuration leads to establishment of the communication among a passage in a through-hole 287 of a disk 229, a passage in a passage groove 330 of the piston rod 6, a passage in a large-diameter hole portion 276 of the pilot case 36 of the extension-side damping force generation mechanism 341, and the back-pressure chamber 280 of the pilot case 36 of the damping force variable mechanism 343, with them attached to the piston rod 6 in this manner. Further, a communication passage 371 is formed in the pilot case 36. The communication passage 371 establishes constant communication between the back-pressure chamber 280 and the variable chamber 271. Further, the present configuration leads to establishment of constant communication of the variable chamber 272 of the damping force variable mechanism 343 with the cylinder lower chamber 2B via the through-hole 267 of the cover member 239. A passage in a cutout 291, the passage in the large-diameter hole portion 276, the passage in the passage groove 330, the passage in the large-diameter hole portion 246, the passage in the cutout 251 of the disk 232, the variable chambers 271 and 272, and the passage in the through-hole 267 form an extension-side second passage 281 that branches off from an extension-side first passage 201 and is provided in parallel with the first passage 201 after the branching. Therefore, the two variable chambers 271 and 272, which are at least a part of the second passage 281, are provided by being defined by the partition disk 234 inside the case member 240.

The partition disk 234 is configured to be deformable within a range in which the inner peripheral side thereof moves between the disk 232 and the disk 235 and the outer peripheral side thereof moves between the seat portion 243 and the cover member 239. Now, a shortest axial distance between the seat portion 243 supporting the outer peripheral side of the disk 255 of the partition disk 234 from one axial side and the disk 235 supporting the inner peripheral side of the disk 255 from the opposite axial side is shorter than an axial thickness of the disk 255. Therefore, when the pressures in the variable chambers 271 and 272 match each other, the disk 255 is in pressure contact with the seat portion 243 and the disk 235 along an entire circumference in a slightly deformed state due to an elastic force of the disk 255 itself. The partition disk 234 blocks the flow of the oil fluid between the variable chambers 271 and 272 of the second passage 281 with the inner peripheral side thereof in contact with the disk 235 along the entire circumference. The partition disk 234 is set so as to be in constant contact with the disk 235 along the entire circumference thereof regardless of the pressure states of the variable chambers 271 and 272, and therefore constantly blocks the flow between the variable chambers 271 and 272 of the second passage 281. The partition disk 234 may be configured to block the flow during the extension stroke but permit the flow during the compression stroke. The partition disk 234 completely blocks the flow between the variable chambers 271 and 272 in the present exemplary embodiment, but may permit this flow as long as permitting only an extremely small orifice or something like that.

Then, a disk valve 43 is provided at the upper end of the piston 5. The disk valve 43 is provided with the shaft portion 24 inserted through a central shaft hole thereof and an inner peripheral edge portion thereof sandwiched between the inner peripheral portion of the piston valve 5 and a holding portion 25 formed at the lower end of the piston case 21 (a lower end of the case bottom portion 23). Further, an outer peripheral edge portion of the disk valve 43 is seated on an annular seat portion 45 formed at the upper end of the piston case 5 so as to cover an annular recessed portion 44 formed at the upper end of the piston valve 5. Further, an upper end of the compression-side passage 20 is opened to the annular recessed portion 44 although this is not illustrated in FIG. 2.

A disk valve 47 is provided on the lower end of the piston case 21. The disk valve 47 is provided with the shaft portion 24 inserted through a central shaft hole thereof and an inner peripheral edge portion thereof sandwiched between a spacer 48 and the holding portion 25 of the piston case 21. Further, an outer peripheral edge portion of the disk valve 47 is seated on an annular seat portion 49 formed at the lower end of the piston case 21. Due to this configuration, the disk valve 47 covers an opening of an annular recessed portion 50 formed at the lower end of the piston case 21. The annular recessed portion 50 is in communication with the back-pressure chamber 280 via a vertically extending passage 28 formed on an outer peripheral surface of the shaft portion 24 of the piston case 21 and a passage 46 formed at the shaft portion 36A of the pilot case 36. Further, the components with the shaft portion 24 inserted through the shaft holes thereof, including the piston valve 5, are fixed to the lower end of the piston case 5 due to an axial force generated by tightening a nut 26 attached to the lower end portion of this shaft portion 24.

As illustrated in FIG. 2, a plurality of passages 51 (only two of them are illustrated in FIG. 2) is provided through the case bottom portion 23. The passages 51 extend through this case bottom portion 23 vertically. Each of the passages 51 has a lower end opened to the annular recessed portion 50 inside the seat portion 49, and an upper end opened to a chamber 52 formed at the bottom portion in the piston case 21. An annular seat portion 54 is seated on a bottom surface of the piston case 21 (a bottom surface of the chamber 52). The seat portion 54 is formed at a lower end of a first valve body 53. Further, a recessed portion is formed at a center of the bottom surface of the piston case 21, and a first valve chamber 56 is formed between the first valve body 53 and the case bottom portion 23 by seating of the seat portion 54 of the first valve body 53 onto a valve seat 55 formed on a circumferential edge of an opening of this recessed portion. The first valve chamber 56 is in communication with the cylinder lower chamber 2B (refer to FIG. 1) via a passage 57 (an axial hole) vertically extending through a center of the shaft portion 24.

A second passage establishing communication between the cylinder upper chamber 2A and the cylinder lower chamber 2B is formed by the passage 57, the first valve chamber 56, a flow passage defined by opening of the first valve body 53, the chamber 52, the passage 51, and a flow passage defined by opening of the disk valve 47. In other words, the communication through the second passage is established and blocked by opening and closing of the disk valve 47. Further, the second passage establishes the communication between the cylinder upper chamber 2A and the cylinder lower chamber 2B by the opening of the first valve body 53 due to an increase in a pressure in the first valve chamber 56 to a set load when the piston valve 5 (the piston rod 6) moves to a compression side (an opposite side). Further, the chamber 52 is in communication with the back-pressure chamber 280 via the passage 51, the annular recessed portion 50, and the passage 28.

On the other hand, the first valve body 53 is formed into a stepped columnar shape including a large diameter portion 58 and a small diameter portion 59. Further, the small diameter portion 59 on an upper side of the first valve body 53 is slidably and fittedly mounted in a lower portion of a shaft hole 61 of the case member 60 having a lower end opened to the chamber 52. Then, the first valve body 53 slides on the case member 60 only at one portion (the small-diameter portion 59), and a metal seal structure is formed between this first valve body 53 and the case member 60.

On the other hand, a recessed portion 62 is provided to the case member 60. The recessed portion 62 is opened to a bottom surface of this case member 60. The recessed portion 62 has a larger inner diameter than an outer diameter of the large diameter portion 58 of the first valve body 53, and the lower end of the shaft hole 61 is opened to a bottom surface of this recessed portion 62. The above-described chamber 52 is a space surrounded by a portion of the first valve body 53 protruding from the shaft hole 61 of the case member 60, the case bottom portion 23, and the case member 60.

A bore 63 is formed at the first valve body 53. The bore 63 is opened to an upper end of the first valve body 53 (an upper end of the small diameter portion 59). A second valve body 65 is housed in the bore 63. The second valve body 65 is seated on a valve seat 64 that is a bottom surface of this bore 63 (a part of the first valve body 53). An annular seat portion 67 is seated on the valve seat 64. The seat portion 67 is formed on a circumferential edge of a lower end of the second valve body 65. Further, set loads of the first valve body 53 and the second valve body 65 are adjusted variably according to a thrust force of a solenoid 66. Then, a sub valve 68 includes the first valve body 53, the second valve body 65, and an actuator that moves the first valve body 53 and the second valve body 65 with use of the thrust force of the solenoid 66. Besides the solenoid 66, for example, a servomotor can be employed as the actuator.

The first valve body 53 includes a second valve chamber 69, a passage 70, and a passage 71. The second valve chamber 69 is formed by a blind hole opened to a center of the bottom surface of the bore 63. The passage 70 extends through the large diameter portion 58 radially to establish communication between the second valve chamber 69 and the chamber 52. The passage 71 establishes communication between the second valve chamber 69 and the cylinder lower chamber 2B when the second valve body 65 is opened. The above-described valve seat 64 is formed on a circumferential edge of an opening of the second valve chamber 69.

On the other hand, a flange 72 is formed on a circumferential edge of an upper end of the second valve body 65 installed in the first valve body 53. An outer circumferential surface of the flange 72 is in slidable abutment with an inner peripheral surface of the bore 63. A compression coil spring 73 is disposed between the flange 72 and the bottom surface of the bore 63. The compression coil spring 73 biases the second valve body 65 upward relative to the first valve body 53. Further, the second valve body 65 includes a hole 74 opened to a center of an upper end of this second valve body 65. A conical surface 76 is formed at a center of a bottom portion of the hole 74. The conical surface 76 receives a semi-spherical lower end of an actuation pin 75.

The actuation pin 75 includes a shaft portion 77 and a base portion 79. The shaft portion 77 has a lower end received by the conical surface 76. The base portion 79 has a semi-spherically shaped lower portion and includes a protrusion 78 provided at a center of an upper end thereof. Further, the semi-spherical surface of the base portion 79 of the actuation pin 75 is received by a conical surface 81 formed at a plunger 80 of the solenoid 66. The conical surface 81 is formed at a bottom portion of a hole 82 opened to an upper end of the plunger 80. This hole 82 is in communication with a pin insertion hole 83 opened to a center of a lower end of the plunger 80. Further, the semi-spherical surface of the base portion 79 of the actuation pin 75 is pressed against the conical surface 81 of the plunger 80 by a compression coil spring 85 disposed between an upper end of the base portion 79 of this actuation pine 75 and a spring bearing member 84 attached to an upper end of the shaft hole 61 of the case member 60.

On the other hand, the first valve body 53 is biased downward relative to the case member 60 by a biasing force of a biasing unit via the second valve body 65 and the actuation pin 75. Due to this configuration, a set load (a valve-opening pressure) of the first valve body 53 when the piston valve 5 (the piston rod 6) moves to the compression side (the opposite side) can be adjusted by variably controlling the thrust force of the solenoid 66. The biasing unit in the first embodiment is the compression coil spring 85.

Further, the second valve body 65 is biased downward relative to the plunger 80 by a compression coil spring 86 externally attached to the shaft portion 77 of the actuation pin 75. The compression coil spring 86 is compressed between a washer 87 and the bottom surface of the bore 63. The washer 87 is attached to the lower end of the plunger 80 with the shaft portion 77 of the actuation pin 75 inserted therethrough. Further, the plunger 80 is fittedly mounted slidably together with the shaft hole 61 of the case member 60, i.e., the small diameter portion 59 of the first valve body 53. Further, a space 88 formed between the plunger 80 in the shaft hole 61 of the case member 60 and the second valve body 65 is in communication with the bore 63 via a passage 89 formed at the flange portion 72 of the second valve body 65.

On the other hand, the case member 60 includes a small diameter portion 92 formed on an upper end side, and a large diameter portion 94 formed on a lower end side. The small diameter portion 92 is fitted to a recessed portion 91 opened to a center of a lower end of a coil cap 90. An O-ring 93 seals between the recessed portion 91 and the small diameter portion 92. The O-ring 93 is mounted on this small diameter portion 92. Further, the large diameter portion 94 is fitted to an inner peripheral surface 22A of the case main body portion 22 of the piston case 21. An O-ring 95 seals between the inner peripheral surface 22A of the case main body portion 22 of the piston case 21 and the large diameter portion 94. The O-ring 95 is attached to this large diameter portion 94. A flange 96 is formed at a lower end of the large diameter portion 94. The flange 96 is fitted to an inner peripheral surface of the case bottom portion 23. Further, the lower end of the case main body 22 is brought into abutment with the flange 96.

The coil cap 90 is fitted to an upper end portion of the inner peripheral surface 22A of the case main body 22. An O-ring 99 seals between the inner peripheral surface 22A and the coil cap 90. The O-ring 99 is attached to this coil cap 90. Further, a boss portion 97 is formed at a lower end of the coil cap 90, and a shaft hole of this boss portion 97 forms the above-described recessed portion 91. The boss portion 97 of the coil cap 90 and the case member 60 are inserted in a coil 98 of the solenoid 66 from an upper end and a lower end thereof, respectively. The coil 98 is inserted in the case main body 22, and is vertically supported between the coil cap 90 and the large diameter portion 94 of the case member 60.

A cylindrical portion 101 is formed at a center of an upper end of the coil cap 90. The cylindrical portion 101 is fitted to a recessed portion 100 opened to the lower end of the piston rod 6. An O-ring 102 seals between the recessed portion 100 of the piston rod 6 and the cylindrical portion 101 of the coil cap 90. The O-ring 102 is attached to this cylindrical portion 101. Further, an O-ring 103 seals between the piston rod 6 and the case main body 22. The O-ring 103 is attached to the lower end of this piston rod 6.

The piston rod 6 and the case main body 22 are coupled with each other via a screw 104. Further, a shaft hole 105 of the piston rod 6 is in communication with the coil 98 via a shaft hole 101A of the cylindrical portion 101 of the coil cap 90, a cutout-shaped passage 106 radially extending at the lower end of this coil cap 90, and a passage 107 establishing communication between the shaft hole 101A and the passage 106, and a cable for suppling power to the coil 98 is inserted through the shaft hole 105 of this piston rod 6. Now, a reference numeral 108 in FIG. 2 indicates a stopper externally attached on the piston rod 6 and also provided at the upper end of the piston case 21, and reference numerals 109 and 110 in FIG. 2 indicate a portion chamfered on two surfaces for engaging a tool at the time of assembling.

Further, the hole 82 of the plunger 80 is in communication with the cylinder upper chamber 2A via a shaft hole 84A of the spring bearing member 84, a passage 111 extending along a central line of the case member 60, an orifice 112 formed at the upper end of this passage 111, a chamber 113 formed between the recessed portion 91 of the coil cap 90 and the upper end of the small diameter portion 92 of the case member 60, an annular passage 114 formed between an outer peripheral edge of the upper end of the coil cap 90 and the case main body 22 of the piston case 21, a passage 115 formed at the coil cap 90 and establishing communication between the chamber 113 and the passage 114, and a passage 116 formed at the case member 22. Due to this configuration, a passage for releasing air in the piston case 21 that is left at the time of the assembling can be formed.

Next, functions of the first embodiment will be described.

When a vibration has occurred on the vehicle with the shock absorber 1 mounted between a sprung side and an unsprung side of a suspension apparatus, this shock absorber 1 causes the piston rod 6 to be extended from and compressed into the outer tube 3, thereby generating the damping force at the damping force generation mechanism 341 and thus absorbing the vibration on this vehicle. At this time, the damping force generation mechanism 341 adjusts the damping force by variably adjusting the back pressure of the main valve 32 (the pressure in the back-pressure chamber 280) to thus change the valve-opening pressure of the damping valve 33 at the time of the extension stroke of the piston rod 6 (hereinafter referred to as "at the time of the extension stroke), while adjusting the damping force by controlling the thrust force of the solenoid 66 to thus change the set load (the valve-opening pressure) of the first valve body 53 at the time of the compression stroke of the piston rod 6 (hereinafter referred to as "at the time of the compression stroke).

First, at the time of the extension stroke, the oil fluid (the hydraulic fluid) on the cylinder upper chamber 2A side is pressurized due to the movement of the piston valve 5 in the cylinder 2. Then, when the second valve body 65 is closed, i.e., the seat portion 67 of the second valve body 65 is seated on the valve seat 64 formed at a part of the first valve body 53, an upstream side of the back-pressure chamber 280 is in communication with the cylinder upper chamber 2A via the passage 46, the passage 28, the annular recessed portion 50, and the back-pressure chamber introduction passage 35 formed at the disk valve 47. As a result, the pressurized oil fluid on the cylinder upper chamber 2A side is introduced into the back-pressure chamber 280 via the back-pressure chamber introduction passage 35, the annular recessed portion 50, the passage 28, and the passage 46.

On the other hand, a downstream side of the back-pressure chamber 280 is in communication with the second valve chamber 69 via the passage 46, the passage 28, the annular recessed portion 50, the passage 51, the chamber 52, and the passage 70. As a result, the shock absorber 1 can adjust the set load (the valve-opening pressure) of the damping valve 33 by controlling the thrust force (a control current) of the solenoid 66 to variably adjust the pressure in the back-pressure chamber 280, i.e., the back pressure of the main valve 32. Now, when the pressure in the second valve chamber 69 reaches the set load of the second valve body 65 and this second valve body 65 is opened, the second valve chamber 69 in communication with the back-pressure chamber 280 is brought into communication with the cylinder lower chamber 2B via the passage 71 formed at the first valve body 53, the first valve chamber 56, and the passage 57.

Figure 3:
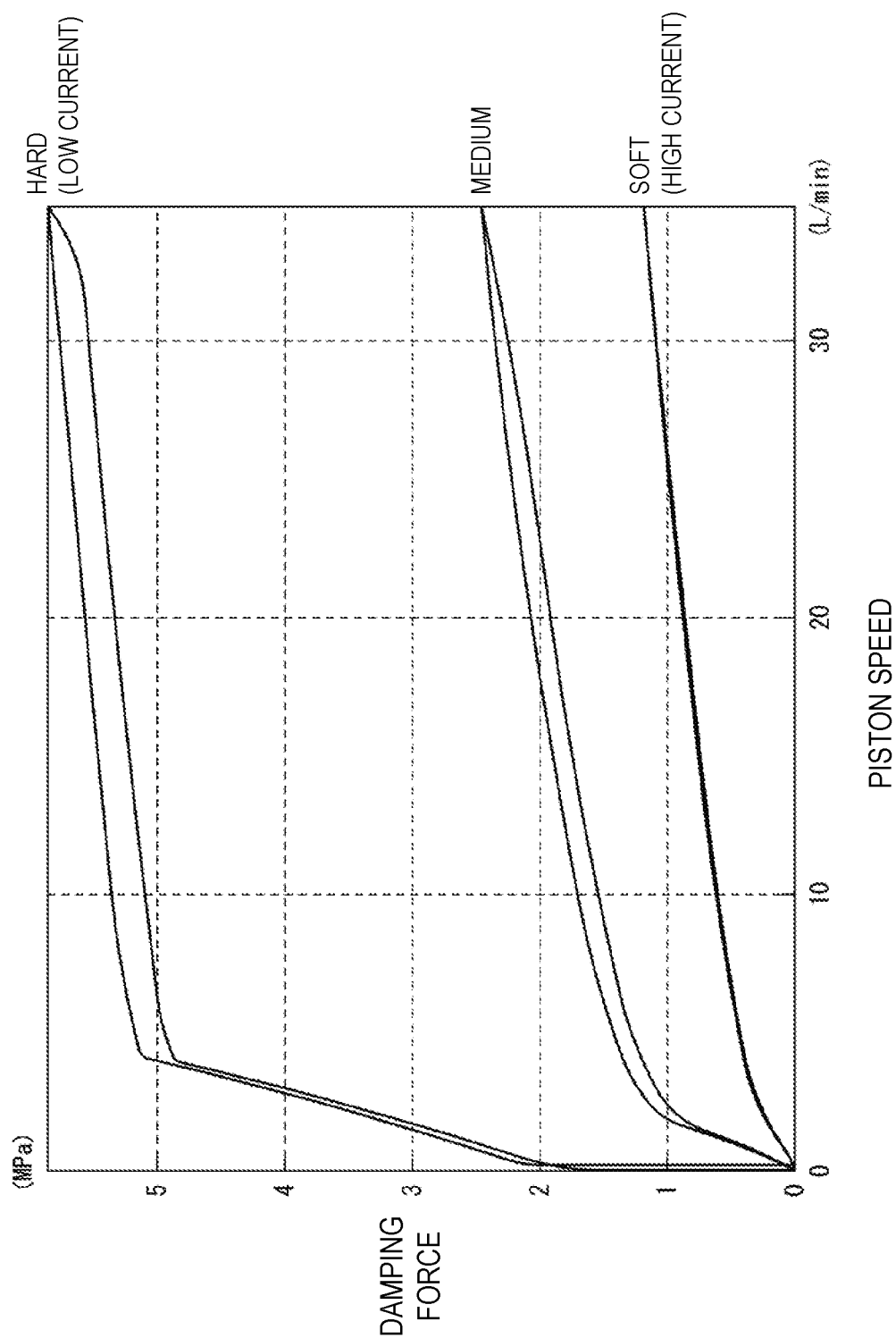
FIG. 3 illustrates the first embodiment, and is a graph indicating simulation results of damping force characteristics at the time of an extension stroke that are acquired when a thrust force of a solenoid is set to a hard side, a medium side, and a soft side, respectively.

Before the main valve 32 is opened, a damping force according to an orifice characteristic can be acquired due to the oil fluid passing through the orifice 29 formed at the damping valve 33 via the passage 28 and the extension-side passage 19. Further, after the main valve 32 is opened, a damping force according to a valve characteristic of the damping valve 33 can be acquired due to the flow of the oil fluid flowing via the first passage. Further, the oil fluid flows from the reservoir 4 into the cylinder lower chamber 2B by opening the check valve 10 of the base valve 7 by an amount corresponding to an exit of the piston rod 6 out of inside the cylinder 2. Further, at the time of the extension stroke, the first valve body 53 is not opened because of the communication established between the first valve chamber 56 and the cylinder lower chamber 2B via the passage 57. Now, FIG. 3 illustrates simulation results using an analysis apparatus, and illustrates curves indicating damping force characteristics at the time of the extension stroke that are acquired when the thrust force of the solenoid 66 is set to a hard side (a low control current), a medium side (an intermediate control current), and a soft side (a high control current).

Now, when a piston frequency is high, the oil fluid is introduced from the cylinder upper chamber 2A into the back-pressure chamber 280 only by a small amount, and therefore the partition disk 234 (the disk) is less deformed and is not brought into a state where the deformation thereof is restricted due to the abutment with the cover member 239. Therefore, a soft damping force is generated during every extension stroke. This operation leads to an increase in the pressure in the back-pressure chamber 280 by an amount corresponding to stiffness of the partition disk 234 (a spring reaction force), but the high piston frequency and the small deflection of the partition disk 234 can cut down the increase in the pressure in the back-pressure chamber 280, thereby preventing or reducing an influence on easy opening of the main valve 32.

On the other hand, when the piston frequency is low, the piston valve 5 exhibits a large amplitude. During the extension stroke when the piston frequency is low in this manner, a frequency of the deformation of the partition disk 234 also reduces according thereto. Therefore, at the beginning of the extension stroke, the oil fluid flows from the cylinder upper chamber 2A into the back-pressure chamber 280 in a similar manner to the above-described flow. However, after that, because the oil flows into the back-pressure chamber 280 by a large amount and the partition disk 234 is largely deformed, the partition disk 234 abuts against the cover member 239 and is brought into a state where the deformation more than that is restricted, thereby prohibiting the oil fluid from flowing from the cylinder upper chamber 2A to the back-pressure chamber 280. Due to the stop of the flow of the oil fluid from the back-pressure chamber 280 into the cylinder upper chamber 2A, the pressure in the back-pressure chamber 280 increases and creates a state prohibiting the main valve 32 from opening. In other words, the main valve 32 is not opened, and a hard extension-side damping force is generated.

On the other hand, at the time of the compression stroke, the oil fluid (the hydraulic fluid) on the cylinder lower chamber 2B side is pressurized due to the movement of the piston valve 5 in the cylinder 2. Due to this pressurization, the oil fluid on the cylinder lower chamber 2B side passes through the compression-side passage 20 and opens the disk valve 43, and thus establishes the communication through the second passage to flow into the cylinder upper chamber 2A eventually. As a result, the shock absorber 1 can acquire a damping force of a valve characteristic due to this disk valve 43. The oil fluid flows into the reservoir 4 by an amount corresponding to the entry of the piston rod 6 into the cylinder 2 due to the increase in the pressure in the cylinder lower chamber 2B to the valve-opening pressure of the disk valve 11 of the base valve 7 and the opening of this disk valve 11.

In parallel therewith, the set load (the valve-opening pressure) of the first valve body 53 is variably adjusted by controlling the thrust force (the control current) of the solenoid 66 at the time of the compression stroke. In other words, the first valve body 53 is opened against the thrust force of the controlled solenoid 66. Then, due to the opening of the first valve body 53, the oil fluid on the cylinder lower chamber 2B side passes through the passage 57, the chamber 52, the passage 51, and the annular recessed portion 50, and further opens the disk valve 47 with the back-pressure chamber introduction passage 35 formed thereon to thus flow into the cylinder upper chamber 2A. As a result, the shock absorber 1 can acquire a damping force according to a valve characteristic due to the disk valve 47. At the time of the compression stroke, the first valve body 53 and the second valve body 65 move integrally with each other.

Next, advantageous effects of the first embodiment will be described.

Now, in the case where two metal seal portions are formed at the valve body as indicated in the above-described patent literature, PTL 1, processing precision of the valve body and the damping piston with this valve body mounted thereon, i.e., surface roughness, precision of a surface shape, coaxiality between the two metal seal portions, and the like should be improved to ensure a smooth operation of the valve body, which leads to an increase in manufacturing cost of the damping force adjustable shock absorber.

On the other hand, in the first embodiment, the shock absorber 1 is configured in such a manner that the main valve 32 is disposed below the piston valve 5, and the sub valve 68 for variably adjusting the set load of this main valve 32 is provided in the piston case 21 above the piston valve 5, with the first valve body 53 of this sub valve 68 slidably sealed by the metal seal at only one portion without being sealed by metal seals at a plurality of portions to the case member 60. Due to this configuration, the shock absorber 1 can ease the precision of the components of the sub vale 68, thereby realizing a reduction in the manufacturing cost and improvement of productivity while securing a performance equivalent to the conventional damping force adjustable shock absorber including the damping valve mechanism built in the cylinder.

Further, in the first embodiment, the shock absorber 1 employs, as the main valve 32, the so-called packing valve in which the seat portion 37A of the packing 37 fixed to the damping valve 33 is in slidable abutment with the annular recessed portion 38 of the pilot case 36, thereby being able to be easily designed and manufactured. As a result, the shock absorber 1 can reduce the manufacturing cost and also ensure reliability.

Further, conventionally, in the case where the back pressure of the main valve has been variably adjusted, an orifice has been formed at a component designed in correspondence with each type, which has made an increase in the manufacturing cost inevitable. On the other hand, in the first embodiment, the shock absorber 1 includes the back-pressure chamber introduction passage 35 formed at the disk valve 47, thereby eliminating the necessity of manufacturing the component where the orifice is formed type by type and thus being able to prevent or cut down the increase in the manufacturing cost. Further, in the first embodiment, the shock absorber 1 allows the disk valve 47 with the back-pressure chamber introduction passage 35 formed thereon to function as the check valve that generates the damping force at the time of the compression stroke.

Further, the shock absorber 1 is provided with the damping force variable mechanism 343 capable of variably adjusting the damping force passively according to the frequency, and therefore can set the damping force characteristic to the soft side only when the piston frequency is high, i.e., only in a high frequency band, which is difficult to control, while little affecting the damping force characteristic when the piton frequency is low.

Such mechanisms capable of variably adjusting the damping force passively according to the frequency are a known technique, but all of them are available just as axially elongated large-sized mechanisms. However, the damping force variable mechanism 343 according to the present embodiment is realized by being provided on the opposite side of the pilot case 36, thereby being able to reduce in axial length.

Second Embodiment

Figure 4:
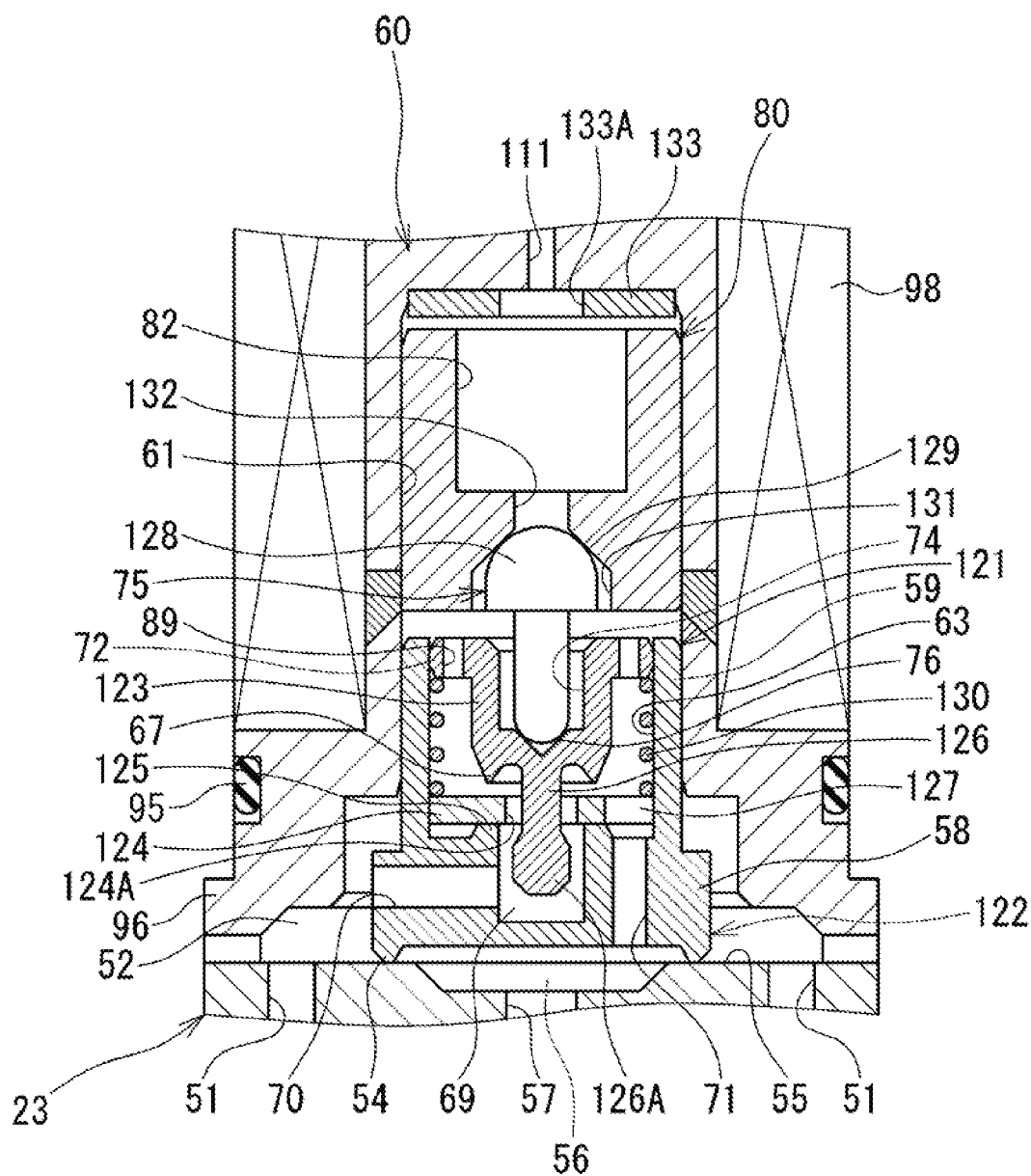
FIG. 4 illustrates a second embodiment.

Next, a second embodiment will be described with reference to FIG. 4. The second embodiment will be described, identifying a configuration the same as or corresponding to the first embodiment by the same reference numeral and omitting a detailed description thereof.

In the above-described first embodiment, the shock absorber 1 includes the so-called normally closed sub valve 68, in which the second valve body 65 is seated on the valve seat 64 formed at the first valve body 53 due to the biasing force of the compression coil spring 85 (the biasing unit) when the thrust force of the solenoid 66 becomes zero (the control current becomes zero). On the other hand, in the second embodiment, the shock absorber 1 includes a so-called normally opened sub valve 121, in which a second valve body 123 moves upward relative to a first valve body 122 to be separated from a valve seat member 124 due to a biasing force of a compression coil spring 130 (the biasing unit) when the thrust force of the solenoid 66 becomes zero.

The sub valve 121 includes the first valve body 122 and the second valve body 123 housed in the bore 63 of this first valve body 122. Similarly to the first embodiment, the first valve body 122 is formed into a stepped columnar shape including the large diameter portion 58 and the small diameter portion 59, and the small diameter portion 59 on the upper side is slidably and fittedly placed in the shaft hole 61 of the case member 60. The first valve body 122 slides on the case member 60 only at one portion (the small-diameter portion 59), and a metal seal structure is formed between this first valve body 122 and the case member 60. Further, the first valve body 122 is biased downward relative to the second valve body 65 by the compression coil spring 130 (the biasing unit in the second embodiment) disposed between the flange 72 and the valve seat member 124, which will be described below.

On the other hand, the second valve body 123 is seated on the valve seat member 124 provided at the bottom portion of the bore 63 of the first valve body 122. An outer peripheral surface of the valve seat member 124 is formed into a ring shape in slidable abutment with the bore 63, and an inner peripheral edge portion of the valve seat member 124 is supported by an annular protrusion portion 125 formed on the circumferential edge of the opening of the second valve chamber 69. Then, the seat portion 67 of the second valve body 123 is seated on the edge portion of the inner periphery of the valve seat member 124. In other words, the second valve body 123 is seated on the annular protrusion portion 125 (a part thereof) of the first valve body 122 via the valve seat member 124.

Further, the second valve body 123 includes a shaft portion 126 extending downward while extending through a shaft hole 124A of the valve seat member 124. A lower end portion 126A is formed at the shaft portion 126. The lower end portion 126A has an outer diameter larger than an outer diameter of this shaft portion 126 and smaller than an inner diameter of the shaft hole 124A of the valve seat member 124. This lower end portion 126A is located in the second valve chamber 69 when the second valve body 123 is closed. The second valve chamber 69 is brought into communication with the first valve chamber 56 via a cutout-shaped passage 127 formed at the valve seat member 124 due to opening of the second valve body 123, i.e., separation of the annular seat portion 67 from the valve seat member 124.

On the other hand, the semi-spherical lower end of the actuation pin 75 is received by the conical surface 76 formed at the center of the bottom portion of the hole 74 of the second valve body 123. Further, a semi-spherical surface formed at an upper end of a head portion 128 of the actuation pin 75 is received by a conical surface 129 formed at the plunger 80 of the solenoid 66. In other words, the conical surface 81 in the first embodiment and the conical surface 129 in the second embodiment are oriented in vertically opposite directions from each other. An opening 131 at the lower end of the plunger 80 is in communication with the hole 82 opened to the upper end of the plunger 80 via a passage 132. Further, the hole 82 is in communication with the passage 111 extending along the central line of the case member 60 via a shaft hole 133A of an annular member 133 provided at the upper end of the shaft hole 61 of the case member 60.

Next, advantageous effects of the second embodiment will be described.

According to the second embodiment, the main valve 32 and the sub valve 121 operate at the time of the extension stroke and the compression stroke in a similar manner to the operations of the main valve 32 and the sub valve 68 according to the above-described first embodiment. Therefore, the second embodiment can bring about similar advantageous effects to the above-described first embodiment.

Further, in the second embodiment, for example, when an electric system has failed and the thrust force of the solenoid 66 becomes zero, the second valve body 123 moves upward relative to the first valve body 122 due to the spring force of the compression coil spring 130 (the biasing force of the biasing unit), and causes the lower end portion 126A of the shaft portion 126 of the second valve body 123 to be located in the shaft hole 124A of the valve seat member 124. As a result, a passage having a limited flow passage is formed between the lower end portion 126A of the shaft portion 126 of the second valve body 123 and the shaft hole 124A of the valve seat member 124, and the formation of this passage can achieve a damping force according to a medium characteristic when the failure has occurred. An opening area of this passage can be adjusted by a size of the shaft hole 124A of the valve seat member 124, and therefore the present configuration allows tuning to be achieved to acquire a desired damping force characteristic when the failure has occurred only by replacement of the valve seat member 124, thereby improving tunability.

In the second embodiment, the shock absorber 1 also includes the damping force variable mechanism 343 capable of variably adjusting the damping force passively according to the frequency (refer to FIG. 2), similarly to the first embodiment. The shock absorber 1 can set a soft damping force characteristic only when the piston frequency is high, i.e., only in the high frequency band, which is difficult to control, while little affecting the damping force characteristic when the piston frequency is low, regardless of the type of the sub valve, i.e., what kind of sub valve is employed, the normally closed type or the normally opened type.

Such mechanisms capable of variably adjusting the damping force passively according to the frequency are a known technique, but all of them are available just as axially elongated large-sized mechanisms. However, the damping force variable mechanism 343 according to the present embodiment is realized by being provided on the opposite side of the pilot case 36 (refer to FIG. 2), thereby being able to reduce in axial length.

Third Embodiment

Figure 5:
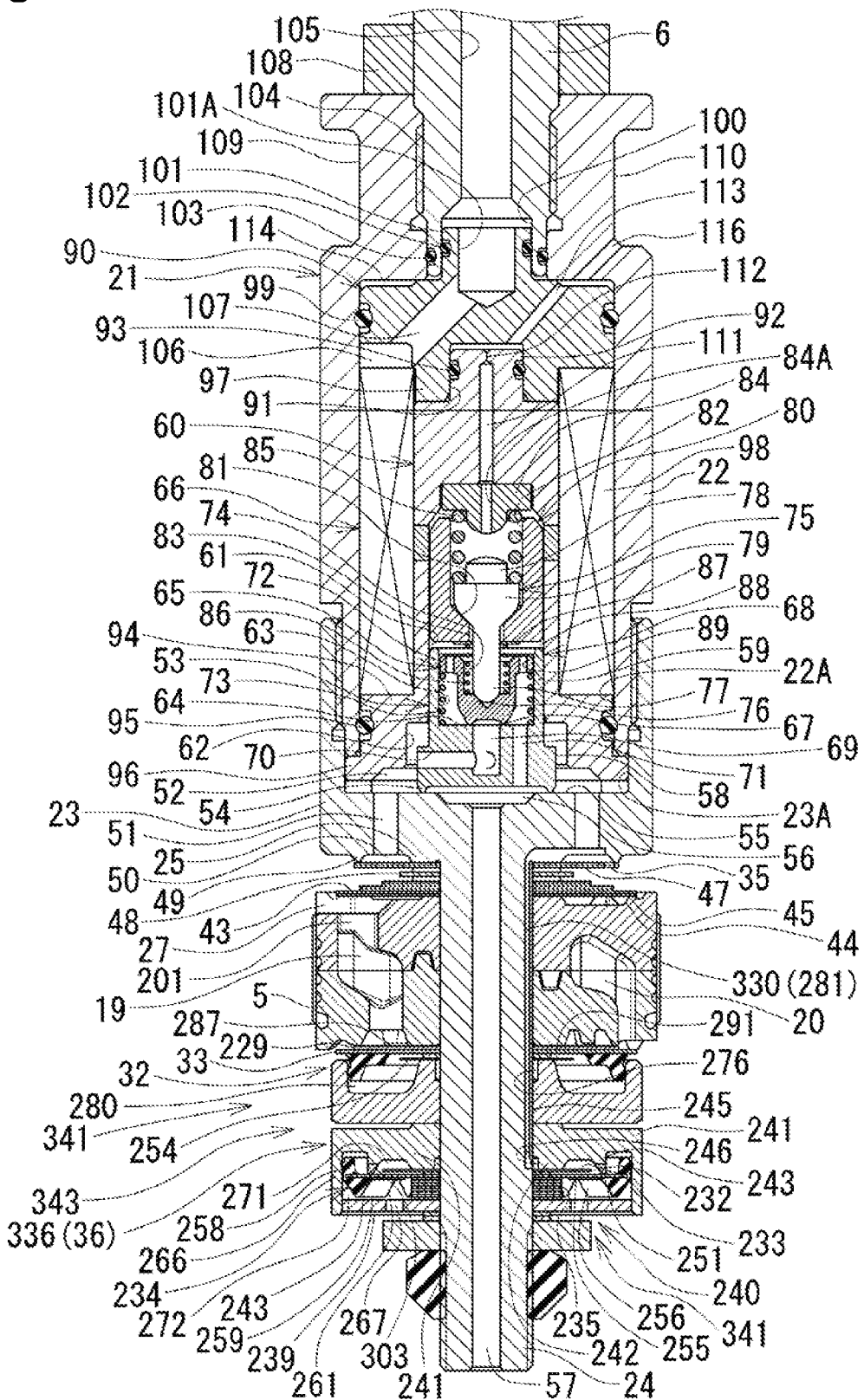
FIG. 5 illustrates a third embodiment.

Next, a third embodiment will be described with reference to FIG. 5. The third embodiment will be described, identifying a configuration the same as or corresponding to the first embodiment by the same reference numeral and omitting a detailed description thereof.

In the above-described first embodiment, the damping force variable mechanism 343 is configured to be provided on the opposite side of the pilot case 36. On the other hand, in the third embodiment, the shock absorber 1 includes a highly productive damping force variable mechanism 343 that is a different component from the pilot case 36 but can be inserted through the shaft portion 24. In the present embodiment, the opposite side of the pilot case 36 is closed, and a similar configured to the first embodiment is housed inside a second case member 336. According thereto, a communication passage establishing communication between the back-pressure chamber 280 and the variable chamber 271 is provided in the shaft portion 24 of the piston rod 6 instead of the communication passage 371 provided at the pilot case 36 for establishing the constant communication with the back-pressure chamber 280. More specifically, the present configuration leads to establishment of the communication among a passage in a through-hole 287 of a disk 229, a passage in a passage groove 330 of the piston rod 6, a passage in a large-diameter hole portion 276 of the pilot case 36 of the extension-side damping force generation mechanism 341, and a passage in large-diameter hole portion 246 of the pilot case 36 of the damping force variable mechanism 343, with them attached to the piston rod 6. This leads to establishment of constant communication of the back-pressure chamber 280 with the variable chamber 271 of the damping force variable mechanism 343 via the passage in the cutout 291 of the disk 254, the passage in the large-diameter hole portion 276 of the pilot case 36, the passage in the communication groove 330 of the piston rod 6, the passage in the large-diameter hole portion 246 of the pilot case 36, and the passage in the cutout 251 of the disk 232. Employing such a configuration allows the damping force variable mechanism 343 to be shorter in axial length than other known mechanisms capable of variably adjusting the damping force passively according to the frequency although being longer compared to the first embodiment. Further, the damping force variable mechanism 343 is configured to be inserted through the shaft portion, thereby being able to improve productivity.

Further, the shock absorber 1 is provided with the damping force variable mechanism 343 capable of variably adjusting the damping force passively according to the frequency, and therefore can set the damping force characteristic to the soft side only when the piston frequency is high, i.e., only in the high frequency band, which is difficult to control, while little affecting the damping force characteristic when the piton frequency is low.

Such mechanisms capable of variably adjusting the damping force passively according to the frequency are a known technique, but all of them are available just as axially elongated large-sized mechanisms. However, the damping force variable mechanism 343 according to the present embodiment is realized by being provided on the opposite side of the pilot case 36, thereby being able to reduce in axial length.

Fourth Embodiment

Next, a fourth embodiment will be described with reference to FIG. 6. The fourth embodiment will be described, identifying a configuration the same as or corresponding to the first embodiment by the same reference numeral and omitting a detailed description thereof.

In the fourth embodiment, a disk 442, a spring 443, and a bottom member 444 are provided instead of the seal member 256, the partition disk 234 including the seal main body portion 258, and the cover member 239.

Figure 6:
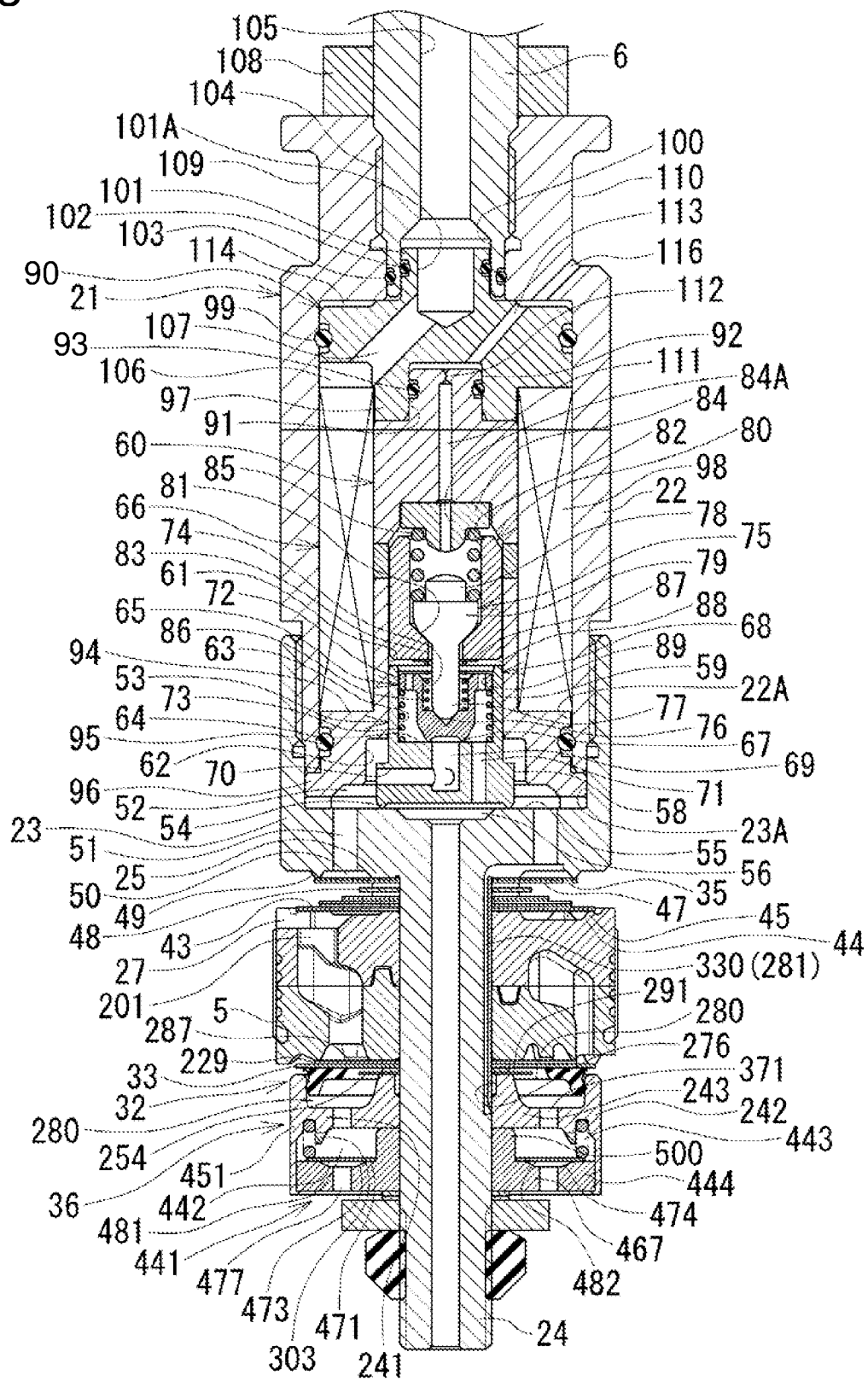
FIG. 6 illustrates a fourth embodiment.

As illustrated in FIG. 6, a damping force variable mechanism 441 is provided at the mounting shaft portion 24 of the piston rod 6 on the opposite side from the main valve 32 of the pilot case 36. The damping force variable mechanism 441 variably adjusts the damping force in reaction to a frequency of a reciprocating movement of the piston valve 5. The damping force variable mechanism 441 includes one disk 442, one spring (elastic member) 443, and the bottom member 444 in this order from the main valve 32 side in the axial direction, and all of them are metallic. The pilot case 36 and the bottom member 444 contain the disk 442 and the spring 443 built therein. Both the pilot case 36 and the bottom member 444 are annularly shaped so as to allow the shaft portion 24 of the piston rod 6 to be fitted inside them.

The bottom member 444 has a holed disk-like shape, and includes an annular bottom portion 467 and an abutment portion 500. The abutment portion 500 is provided so as to extend to a radially inner side of the bottom portion 467 and axially extend into abutment with the cylindrical portion 242.

A flat annular seat surface 471 and an annular recessed portion 474 are formed at the bottom portion 467 of the bottom member 444. The seat surface 471 is located on a radially outer side with respect to the abutment portion 500, and extends perpendicularly to a central axis. The recessed portion 474 is located at a radially intermediate position of the seat surface 471, and includes a stopper surface 473 axially recessed from the seat surface 471. The recessed portion 474 has such a shape that a radial width thereof reduces as a depth thereof increases, and the stopper surface 473 has a shape constant regardless of a circumferential position in cross section in a plane containing the central axis of the bottom portion 467.

A through-hole 477 is formed at a deepest bottom position of the recessed portion 474 of the bottom portion 467, i.e., a central position in the radial width of the recessed portion 474. The through-hole 477 extends through along the axial direction of the bottom portion 467. A plurality of through-holes 477 is formed at the bottom portion 467 at intervals in the circumferential direction of the bottom portion 467. The through-hole 477 may be provided in a different manner as long as at least one through-hole 477 is provided at the bottom portion 467.

An annular disk 442 is disposed at the bottom portion 467 in the pilot case 36. The disk 442 is a metallic elastically deformable plate, and has a holed disk-like shape. The disk 442 has an outer diameter smaller than a maximum diameter of the seat surface 471 and larger than a maximum diameter of the stopper surface 473, and has an inner diameter slightly smaller than a minimum diameter of the seat surface 471. This configuration allows the disk 442 to move axially while being guided by the abutment portion 500 in such a manner that a radial movement thereof is restricted, and cover the entire stopper surface 473 by having surface contact with the seat surface 471.

The through-hole 477 formed at the deepest position of the recessed portion 474 of the bottom portion 467 is provided so as to axially face this disk 442 while being positioned in radial alignment therewith. The disk 442 closes the through-hole 477 by having surface contact with the seat surface 471. The disk 442 is in surface contact with the seat surface 471 by being biased by a spring 443, which is an elastic member. Further, the disk 442 opens the through-hole 447 by being separated from the seat surface 471. Further, the disk 442 is elastically deformable so as to enter the recessed portion 474, and maintains the through-hole 477 in the closed state by abutting against circumferential edge portions of boundaries between the stopper surface 473 and the seat surface 471 on both radial sides or the entire stopper surface 473 at this time. The disk 442 is disposed at the bottom portion 467 in a deflectable state by being provided so as to cover the recessed portion 474 of the bottom portion 467 in this manner.

A variable chamber 481 (a case chamber) is formed between a ceiling portion 451 of the pilot case 36 and the disk 442, and a variable chamber 482 (a case chamber) is formed between the bottom portion 467 of the bottom member 444 and the disk 442, with the disk 442 closing a passage portion of the through-hole 477. Therefore, these two variable chambers 481 and 482 are provided by being defined by the disk 442 in the pilot case 36. The variable chamber 482 is in constant communication with the cylinder lower chamber 2B via the passage portion of the through-hole 477. Further, the variable chamber 481 is in constant communication with the back-pressure chamber 280 via the communication passage 371.

The disk 442 blocks the flow of the oil fluid between the variable chamber 481 and the variable chamber 482 in a state maintaining the disk-like shape thereof with both an inner peripheral side and an outer peripheral side thereof in abutment with the seat surface 471 along an entire circumference, in a state elastically deformed so as to enter the recessed portion 474 with both the inner peripheral side and the outer peripheral side thereof in abutment with the edge portions of the boundaries between the seat surface 471 and the stopper surface 473 on the both sides along the entire circumference, and in a state further elastically deformed into contact with the stopper surface 473 along the entire circumference. Further, the disk 442 permits the flow of the oil fluid between the variable chamber 481 and the variable chamber 482 in the state separated from the bottom portion 467.

The spring 443 is a coil spring, and has one axial end in abutment with between the pilot case 36 and the ceiling portion 451 and an opposite axial end in abutment with a radially outer side of the disk 442. The spring 443 is formed in such a manner that a diameter of a portion thereof in abutment with the disk 442 matches a diameter of a radially intermediate portion of a portion of the seat surface 471 that is located on a radially outer side with respect to the stopper surface 473. This configuration causes the spring 443 to bias the disk 442 into abutment with the seat surface 471. The spring 443, the disk 442, the pilot case 36, and the recessed portion 474 have a function as a check valve that restricts a flow of the oil fluid from the variables chamber 481 side to the variable chamber 482 side, i.e., the cylinder lower chamber 2B side, while permitting a flow of the oil fluid from the variable chamber 482 side, i.e., the cylinder lower chamber 2B side to the variable chamber 481 side.

The disk 442 is deflectable due to the hydraulic fluid in the pilot case 36. Then, when the pressure in the variable chamber 481 exceeds the pressure in the variable chamber 482, the disk 442 is deflected so as to enter the recessed portion 474 as described above to increase a volume of the variable chamber 481 and reduce a volume of the variable chamber 482, while blocking the communication between the variable chamber 481 and the variable chamber 482. Further, when a pressure difference between the pressure in the variable chamber 481 and the pressure in the variable chamber 482 reduces from this state, the disk 442 is deformed so as to reduce the entry thereof into the recessed portion 474 to increase the volume of the variable chamber 482 and reduce the volume of the variable chamber 481, while blocking the communication between the variable chamber 481 and the variable chamber 482. Further, when the pressure in the variable chamber 482 increases to exceed the pressure in the variable chamber 481 by more than an amount corresponding to the biasing force of the spring 443, the disk 442 is separated from the seat surface 471 against the biasing force of the spring 443 to establish the communication between the variable chamber 482 and the variable chamber 481.

Employing such a configuration can also bring about similar advantageous effects to the first embodiment.

Fifth Embodiment

Next, a fifth embodiment will be described. The fifth embodiment will be described, identifying a configuration the same as or corresponding to the first embodiment by the same reference numeral and omitting a detailed description thereof.

The shock absorber 1 is configured to change the valve-opening pressure of the damping valve 33 by variably adjusting the back pressure of the main valve 32 only at the time of the extension stroke of the piston rod 6 in the first embodiment, but is configured to also control the pressure at the time of the compression stroke in the fifth embodiment. More specifically, the shock absorber 1 is configured to include the pilot case and the main valve 32 only on one side of the piston valve 5, but is configured to also include a similar mechanism on the opposite side of the piston valve 5 in the fifth embodiment. Employing such a configuration further allows the shock absorber 1 to, in addition to the advantageous effects of the first embodiment, also control the pressure with use of the main valve 32 at the time of the compression stroke.

Figure 7:
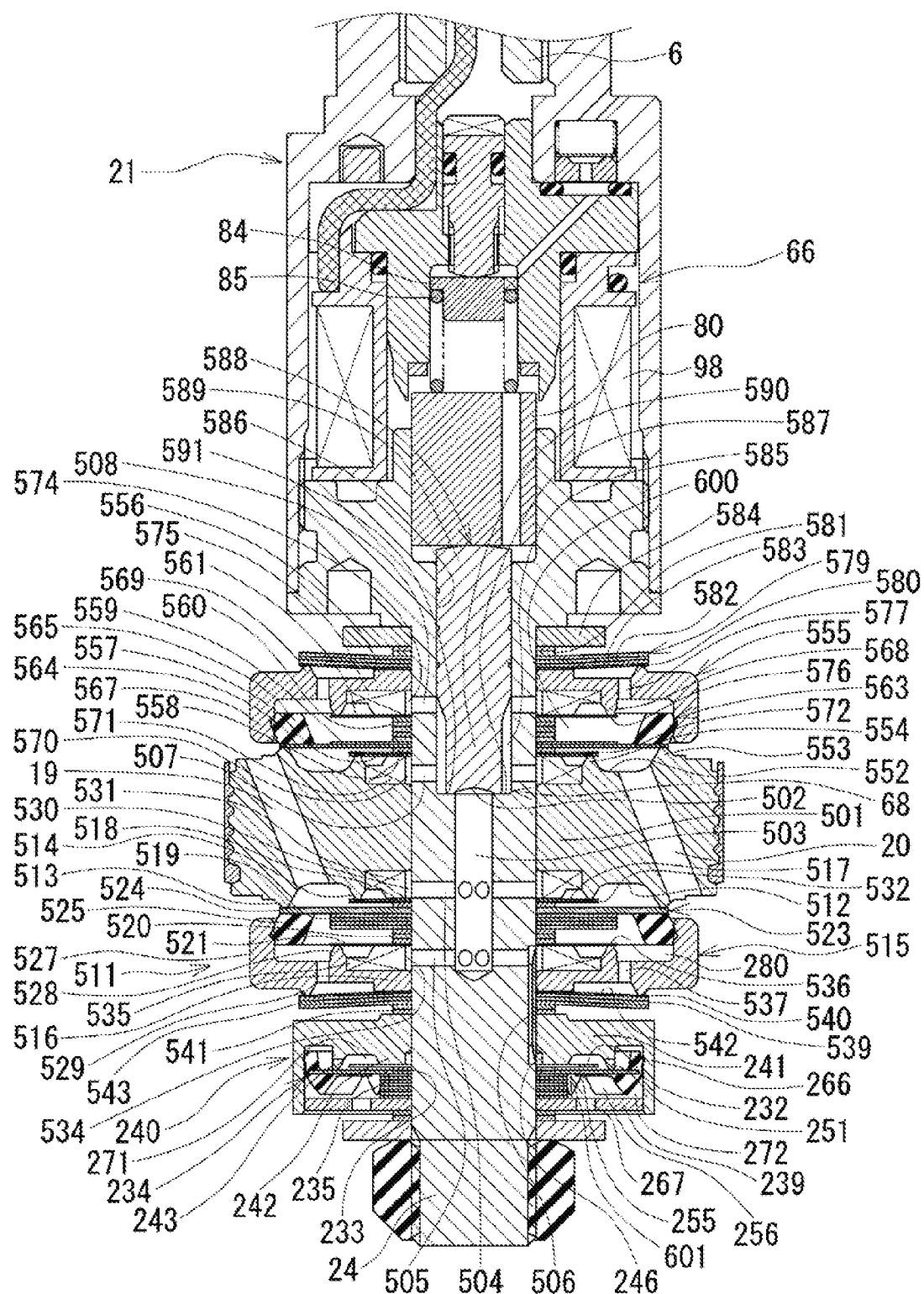
FIG. 7 illustrates a fifth embodiment.

As illustrated in FIG. 7, an extension-side damping force generation mechanism 511 and a compression-side damping force generation mechanism 551 are provided opposite of the piston valve 5 from each other on both the vertical sides of the piston valve 5. First, the extension-side damping force generation mechanism 511 will be described. An annular surface 512, an annular seat portion 513, and an annular seat portion 514 are provided at the lower end of the piston valve 5. The extension-side passage 19 is opened to the annular surface 512. The seat portion 513 is formed outside the annular surface 512. The seat portion 514 is formed inside the annular surface 513. The seat portion 513 protrudes from the annular surface 512 by a higher height than the seat portion 514 protrudes from the annular surface 512.

An inner peripheral portion of a disk 517, a spacer 518, an inner peripheral portion of a disk 524 (a damping vale) of a main valve 523 (a first main valve) as the first valve body, inner peripheral portions of a plurality of disks 519, a plurality of spacers 520, and an inner peripheral portion of a disk 521 are disposed between a lower end of an inner cylindrical portion 501 of the piston valve 5 and an inner cylindrical portion 516 of a seal case 515 (a valve seat member) in this order from the piston valve 5 side. An outer peripheral portion of the disk 517 is seated on the annular seat portion 514 of the piston valve 5. Further, an outer peripheral portion of the disk 524 of the main valve 523 is seated on the annular seat portion 513 of the piston valve 5. An annular seal member 525 (a packing) is fixedly attached to a surface of this disk 524 on an opposite side from a seating surface thereof. The seal member 525 is in slidable abutment with an inner peripheral surface of an outer cylindrical portion 527 of the seal case 515. An annular seat portion 528 (an annular seat portion) is formed at the seal case 515. An outer peripheral portion of the disk 521 is seated on the seat portion 528. This seat portion 528 is provided on a surface on the disk side facing the disk 524 of the main valve 523.

As illustrated in FIG. 7, an axial passage 503 is formed in the shaft portion 24 of the piston case 21 (a tubular case member). The axial passage 503 extends from a valve chamber 502 to a position of the seal case 515. An annular passage 530 is formed between the shaft portion 24 of the piston case 21 and the disk 517 at the lower end portion of the inner cylindrical portion 501 of the piston valve 5. A plurality of radial passages 504 is formed at the shaft portion 24 of the piston case 21. The radial passages 504 establish communication between the axial passage 503 and the annular passage 530. Due to this configuration, the extension-side passage 19 is in communication with the axial passage 503 via the back-pressure chamber introduction passage, i.e., a cutout 532 of the disk 517, a plurality of cutouts 531 formed at the piston valve 5, the annular passage 530, and the plurality of radial passages 504.

On the other hand, an annular passage 534 is formed between the shaft portion 24 of the piston case 21 and the disk 521 at an upper end portion of the inner cylindrical portion 516 of the seal case 515. Then, the axial passage 503 is in communication with the cylinder lower chamber 2B via a plurality of radial passages 505 formed in the shaft portion 24 of the piston case 21, a plurality of cutouts 535 formed at the seal case 515, a cutout 536 (an orifice passage) formed at the disk 521, a plurality of passages 537 formed at the seal case 515, and a cutout 540 (the orifice passage) formed at a hard valve 539 (a unidirectional valve).

An inner peripheral portion of the hard valve 539 formed by a plurality of disks and a plurality of spacers 541 is disposed between the inner cylindrical portion 516 of the seal case 515 and the inner cylindrical portion 242 of the case member 240. The hard valve 539 includes a disk 542 and a plurality of disks 543. The cutout 540 is formed at the disk 542. The disks 543 are thicker in plate thickness than this disk 542, i.e., are higher in stiffness than the disk 542. An outer peripheral portion of the hard valve 539 is seated on an annular seat portion 529 formed on a bottom surface of the seal case 515. This seat portion 529 is provided on an outer side with respect to the passages 537. The disk 542 and the disks 543 of the hard valve 539 are the same as each other in outer diameter and inner diameter. Further, a passage 506 is formed on the outer peripheral surface of the shaft portion 24 of the piston case 21. The passage 506 establishes communication between at least one of the radial passages 505 and the large-diameter hole portion 246 of the inner cylindrical portion 242 of the case member 240.

Next, the compression-side damping force generation mechanism 551 will be described. An annular surface 552, an annular seat portion 553, and an annular seat portion 554 are provided at the upper end of the piston valve 5. The compression-side passage 20 is opened to the annular surface 552. The seat portion 553 is formed outside the annular surface 552. The seat portion 554 is formed inside the annular surface 513. The seat portion 553 protrudes from the annular surface 552 by a higher height than the seat portion 554 protrudes from the annular surface 552.

An inner peripheral portion of a disk 557, a spacer 558, an inner peripheral portion of a disk 564 of a main valve 563 (a second main valve) as the first valve body, an inner peripheral portion of a disk 559, a plurality of spacers 560, and an inner peripheral portion of a disk 561 are disposed between an upper end of the inner cylindrical portion 501 of the piston valve 5 and an inner cylindrical portion 556 of a seal case 555 in this order from the piston valve 5 side. An outer peripheral portion of the disk 557 is seated on the annular seat portion 554 of the piston valve 5. Further, an outer peripheral portion of the disk 564 of the main valve 563 is seated on the annular seat portion 553 of the piston valve 5. An annular seal member 565 (the packing) is fixedly attached to a surface of this disk 564 on an opposite side from a seating surface thereof. The seal member 565 is in slidable abutment with an inner peripheral surface of an outer cylindrical portion 567 of the seal case 555. An annular seat portion 568 is formed at the seal case 555. An outer peripheral portion of the disk 561 is seated on the seat portion 568. This seat portion 568 is provided on a surface on the disk side facing the disk 564 of the main valve 563.

An annular passage 570 is formed between the shaft portion 24 of the piston case 21 and the disk 557 at the upper end portion of the inner cylindrical portion 501 of the piston valve 5. A plurality of radial passages 507 is formed at the shaft portion 24 of the piston case 21. The radial passages 507 establish communication between the axial passage 503 and the annular passage 570. Due to this configuration, the extension-side passage 20 is in communication with an annular passage 585 via a cutout 572 (the orifice passage) of the disk 557, a plurality of cutouts 531 formed at the piston valve 5, the annular passage 570, and the plurality of radial passages 507.

On the other hand, an annular passage 574 is formed between the shaft portion 24 of the piston case 21 and the disk 521 at a lower end portion of the inner cylindrical portion 556 of the seal valve 555. Then, the annular passage 585 is in communication with the cylinder upper chamber 2A via a plurality of radial passages 508 formed at the shaft portion 24 of the piston case 21, a plurality of cutouts 575 formed at the seal case 555, a cutout 576 formed at the disk 561, a plurality of passages 577 formed at the seal case 555, and a cutout 580 formed at a hard valve 579.

An inner peripheral portion of the hard valve 579 formed by a plurality of disks and a plurality of spacers 581 are disposed between the inner cylindrical portion 556 of the seal case 555 and the piston case 21. The hard valve 579 includes a disk 582 and a plurality of disks 583. The cutout 580 is formed at the disk 582. The disks 583 are thicker in plate thickness than this disk 582, i.e., are higher in stiffness than the disk 582. An outer peripheral portion of the hard valve 579 is seated on an annular seat portion 569 formed on a surface of the seal case 555 on an opposite side from the seat portion 568. This seat portion 569 is provided on an outer side with respect to the passages 577. The disk 582 and the disk 583 of the hard valve 579 are the same as each other in outer diameter and inner diameter.

The upper end of the axial passage 503 is opened to a bottom surface 587 (a valve seat) of a valve body housing portion 586 of the piston case 21. A large diameter portion 589 on an upper side of the valve body 588 as the second valve body is slidably and fittedly placed in the valve body housing portion 586. The annular passage 585 is formed between a small diameter portion 590 on a lower side of the valve body 588 and the valve body housing portion 586. An annular seat portion 591 is formed on an outer peripheral edge of a lower end of the small diameter portion 590. The seat portion 591 is seated on the bottom surface 587 of the valve body housing portion 586 as a seat thereof. With the seat portion 591 seated on the bottom surface 587 (the valve seat) of the valve body housing portion 586, the valve chamber 502 is formed inside this seat portion 591. Further, when the seat portion 591 is separated from the bottom surface 587 of the valve body housing portion 586, the radial passages 507 and the radial passages 508 are brought into communication with the axial passage 503 via the annular passage 585.

The plunger 80 of the solenoid 66 is in abutment with the upper end of the large diameter portion 589 of the valve body 588. Further, the plunger 80 is pressed against the valve body 588 by a compression coil spring 85 having an upper end supported by a spring bearing member 84. In other words, the control valve according to the fifth embodiment is structured as a normally closed-type valve, which is closed when no power is supplied to the coil 98.

Then, when the piston frequency is high at the time of the extension stroke, the oil fluid is introduced from the cylinder upper chamber 2A into the back-pressure chamber 280 only by a small amount, and therefore the partition disk 234 (the annular disk) is less deformed and is not brought into the state restricted from being deformed by abutting against the cover member 239. Therefore, the pressure in the back-pressure chamber 280 is kept low, and therefore a soft damping force is generated with the main valve 523 opened without the hard valve 539 opened.

Then, when the valve body 588 of the control valve is opened, the oil fluid on the cylinder upper chamber 2A side flows into the cylinder lower chamber 2B via the extension-side passage 19, the cutout 532 of the disk 517, the cutouts 531 of the piston valve 5, the annular passage 530, the radial passages 504, the axial passage 503, the annular passage 585, the radial passages 507, the annular passage 570, a cutout 571 of the piston valve 5, the cutout 572 of the disk 557, and the compression-side passage 20. A flow rate of the oil fluid flowing at this time increases according to an amount by which the valve body 588 is opened, and therefore the soft damping force is generated.

On the other hand, when the piston frequency is low during the extension stroke, the frequency of the deformation of the partition disk 234 also reduces according thereto. Therefore, at the beginning of the extension stroke, the oil fluid flows from the cylinder upper chamber 2A into the back-pressure chamber 280 in a similar manner to when the piston frequency is high, but the oil flows into the back-pressure chamber 280 by a large amount and the partition disk 234 is largely deformed. Therefore, after that, the partition disk 234 abuts against the cover member 239 and is brought into the state where the deformation more than that is restricted, thereby prohibiting the oil fluid from flowing from the cylinder upper chamber 2A to the back-pressure chamber 280. Due to the stop of the flow of the oil fluid from the back-pressure chamber 280 into the cylinder upper chamber 2A, the pressure in the back-pressure chamber 280 increases and creates a state prohibiting the main valve 523 from opening. In other words, the main valve 523 is not opened, and the hard extension-side damping force is generated. Then, when the pressure in the back-pressure chamber 280 exceeds a predetermined pressure, the hard valve 539 is opened and the hard-side damping force is generated according to an amount by which this hard valve 539 is opened.

On the other hand, at the time of the compression stroke, the pressure is not controlled according to the piston frequency and is controlled only according to the piston speed. The oil fluid on the cylinder lower chamber 2B side flows into a compression-side back-pressure chamber 600 via the compression-side passage 20, the cutout 572 of the disk 557, the cutout 571 of the piston valve 5, the annular passage 570, the radial passages 507, the annular passage 585, the radial passages 508, the annular passage 574, the cutouts 575 of the seal case 555, and the cutout 576 of the disk 561. Then, when the pressure in the back-pressure chamber 600 exceeds a predetermined pressure, the hard valve 579 is opened and the hard-side damping force is generated according to an amount by which this hard valve 579 is opened.

When the piston speed is further sped up and the pressure in the back-pressure chamber 600 increases, the compression-side main valve 563 is opened to release the pressure in this back-pressure chamber 600 by releasing it to the cylinder upper chamber 2A. In parallel therewith, the set load (the valve-opening pressure) of the valve body 588 is variably adjusted by controlling the thrust force (the control current) of the solenoid 66 at the time of the compression stroke. In other words, the valve body 588 is opened against the thrust force of the controlled solenoid 66. Then, according to the opening of the valve body 588, the oil fluid on the cylinder lower chamber 2B side flows into the cylinder upper chamber 2A via the through-hole 267 of the cover member 239, a passage 601 extending through the disks 232, 233, and 234, the large-diameter hole portion 246 of the case member 240, the passage 506, the radial passages 505, the axial passage 503, the annular passage 585, the radial passages 507, the annular passage 570, the cutout 571 of the piston valve 5, the cutout 572 of the disk 557, and the main valve 563.

In this manner, the present configuration also allows the shock absorber 1 to variably adjust the damping force passively in reaction to the frequency not only during the extension stroke but also during the compression stroke in addition to similar advantageous effects to the first embodiment.

The mechanism that includes the control valve 68 and the solenoid 66 and variably controls the damping force based on the electric signal according to the present embodiment may be structured in any manner, and is not limited to the structure according to the present embodiment as long as it is housed in the cylinder.

The shock absorber 1 has been described as being configured to include the seal member 256 and the seal main body portion 258 as the seal unit in the present embodiment, but is not limited thereto and may be configured to, for example, achieve the seal function by including stacked disks without use of the seal member.

REFERENCE SIGN LIST 1 damping force adjustable shock absorber
2 cylinder
2A cylinder upper chamber
2B cylinder lower chamber
5 piston valve (piston)
6 piston rod
19 extension-side passage (first passage)
20 compression-side passage (second passage)

32 main valve (first main valve)
35 back-pressure chamber introduction passage
36 pilot case (first case member)
66 solenoid
68 sub valve (control valve)
234 partition disk (annular disk)
239 cover member (second case member)
255 annular disk
256 seal member (seal unit)
271, 272 variable chamber (two chambers)
280 back-pressure chamber
341 damping force generation mechanism

The invention claimed is:

1. A damping force adjustable shock absorber comprising:
a cylinder sealingly containing hydraulic fluid therein;
a piston slidably and fittedly mounted inside the cylinder and partitioning an inside of the cylinder into two chambers, a one-side chamber and an opposite-side chamber;
a piston rod having one end coupled with the piston and an opposite end protruding out of the cylinder;
a first passage and a second passage establishing communication between the two chambers in the cylinder;
a first main valve configured to generate a damping force against a flow of the fluid in the first passage that is generated when the piston in the cylinder moves to one side;
a second main valve configured to generate a damping force against a flow of the fluid in the second passage that is generated when the piston in the cylinder moves to an opposite side; and
a control valve configured to be driven by a solenoid and control the damping force that is generated when the piston in the cylinder moves to the one side and the opposite side,
wherein the first main valve includes
a damping valve configured to generate the damping force by restricting the flow of the hydraulic fluid flowing via the first passage when the piston moves to the one side,
a back-pressure chamber configured to apply an inner pressure to the damping valve in a valve-closing direction, and
a back-pressure chamber introduction passage configured to introduce the hydraulic fluid from a chamber on an upstream side toward a back-pressure chamber side,
wherein the control valve includes
a tubular case member slidably containing a plunger configured to be driven by the solenoid therein, the tubular case member being opened on one end side thereof,
a valve seat member including an annular valve seat provided on a side facing the opening, the valve seat having an inner peripheral side in communication with the one-side chamber and the back-pressure chamber introduction passage and an outer peripheral side in communication with the opposite-side chamber,
an orifice passage provided between the outer peripheral side of the valve seat and the opposite-side chamber,
a unidirectional valve permitting a flow of the hydraulic fluid from the outer peripheral side of the valve seat to the opposite-side chamber,
the first main valve slidably provided in the case member and configured to control the flow of the hydraulic fluid by being separated from or contacting the valve seat, and
a valve body configured to be seated on an inner valve seat provided between an orifice passage at a bottom portion of the first main valve inside the case member and the one-side chamber, the valve body being configured to move according to the movement of the plunger,
wherein the damping adjustable shock absorber further includes
a tubular case member in which at least a part of the back-pressure chamber introduction passage is formed, the case member being provided on an outer peripheral side of the piston rod,
a deflectable annular disk disposed with the piston rod extending therethrough in the case member, the disk being supported on an inner peripheral side or an outer peripheral side thereof, the disk being provided with an annular elastic seal member sealing between the disk and the case member or between the disk and the piston rod, and
two chambers in the case member that are provided by being defined by the disk,
wherein the disk blocks at least a unidirectional flow through the second passage.

* * * * *